(12) United States Patent
Kim

(10) Patent No.: US 9,469,219 B2
(45) Date of Patent: Oct. 18, 2016

(54) PUMPING DEVICE FOR VEHICLE SEAT

(71) Applicant: DAS CO., LTD, Gyeongju-si (KR)

(72) Inventor: Jae Ho Kim, Yeongcheon-si (KR)

(73) Assignee: DAS CO., LTD, Gyeongju-si (KR)

( * ) Notice: Subject to any disclaimer, the term of this patent is extended or adjusted under 35 U.S.C. 154(b) by 203 days.

(21) Appl. No.: 14/411,519

(22) PCT Filed: Jun. 28, 2013

(86) PCT No.: PCT/KR2013/005740
§ 371 (c)(1),
(2) Date: Dec. 29, 2014

(87) PCT Pub. No.: WO2014/003476
PCT Pub. Date: Jan. 3, 2014

(65) Prior Publication Data
US 2015/0158398 A1    Jun. 11, 2015

(30) Foreign Application Priority Data

Jun. 28, 2012  (KR) .................. 10-2012-0069916

(51) Int. Cl.
*B60N 2/20* (2006.01)
*F16D 41/08* (2006.01)
*B60N 2/16* (2006.01)
*B60N 2/22* (2006.01)
*B60N 2/44* (2006.01)

(52) U.S. Cl.
CPC ............. *B60N 2/1635* (2013.01); *B60N 2/168* (2013.01); *B60N 2/169* (2013.01); *B60N 2/22* (2013.01); *B60N 2/2227* (2013.01); *B60N 2/444* (2013.01)

(58) Field of Classification Search
CPC .... B60N 2/1635; B60N 2/227; B60N 2/444; B60N 2/167–2/169; B60N 2/22; F16D 41/088
See application file for complete search history.

(56) References Cited

U.S. PATENT DOCUMENTS

| 8,424,665 | B2 * | 4/2013 | Kawai | .................. | B60N 2/1615 |
| | | | | | 192/15 |
| 2009/0184554 | A1 * | 7/2009 | Paing | .................... | B60N 2/167 |
| | | | | | 297/358 |
| 2012/0273319 | A1 * | 11/2012 | Hur | ........................ | B60N 2/167 |
| | | | | | 192/15 |

(Continued)

FOREIGN PATENT DOCUMENTS

| JP | 2001-197954 A | 7/2001 |
| JP | 2002-266903 A | 9/2002 |

(Continued)

*Primary Examiner* — Ramya Burgess
*Assistant Examiner* — Lillian Nguyen
(74) *Attorney, Agent, or Firm* — Gokalp Bayramoglu

(57) ABSTRACT

Disclosed herein is a pumping device for a vehicle seat including a clutch portion transferring rotational force input from a handle lever to a link means, a brake portion fixing the link means, a cylindrical front housing accommodating the clutch portion and the brake portion therein and having a pair of stoppers formed on an outer side surface thereof so as to be spaced apart from each other at a predetermined interval, a lever bracket having a pair of bracket legs provided radially outwardly with respect to the respective stoppers, the lever bracket being rotatably arranged on the outer side surface of the front housing so as to connect the handle lever to the clutch portion, and a return spring having a main body portion configured of a ring-shaped leaf spring and a pair of bending portions formed by bending both end portions of the main body portion.

6 Claims, 6 Drawing Sheets

(56) References Cited

U.S. PATENT DOCUMENTS

2012/0279819 A1* 11/2012 Kawai .................. B60N 2/1615 192/55.2
2012/0305359 A1* 12/2012 Sato ..................... B60N 2/1615 192/45.001

FOREIGN PATENT DOCUMENTS

| JP | 4515146 B2 | 7/2010 |
|----|------------|--------|
| KR | 10-2003-0073950 A | 9/2003 |
| KR | 10-0840486 B1 | 6/2008 |
| KR | 1009218490000 | 10/2009 |

* cited by examiner

PUMPING DEVICE FOR VEHICLE SEAT

TECHNICAL FIELD

The present invention relates to a pumping device for a vehicle seat, and more particularly, to a pumping device capable of adjusting a height of a seat and maintaining the adjusted height in such a manner that a user operates a separate link mechanism installed in the seat with operating force.

BACKGROUND ART

In general, a driver seat, an occupant seat, and seats as other occupant seats, which are installed in front of and behind the interior of a vehicle, have various comfort devices for convenience of occupants.

The comfort devices have a sliding function of adjusting forward and rearward pushing/pulling of the seat, a reclining function of adjusting an inclination of a backrest, etc., according to body types of the occupants.

In addition, a vehicle, which is recently developed or has a predetermined reference or more, also includes a pumping device having a seat lifting function of adjusting a height of a seat by receiving input from a handle 100 so as to be suitable for occupants, as shown in FIG. 1.

The pumping device is largely configured of a lever unit, a clutch unit, and a brake unit. The lever unit receives operating force of a user and transfers the operating force to the clutch unit. The clutch unit serves to transfer the input operating force of the user to a link means of the seat. The brake unit serves to cut off power input in reverse so as to fix the link means an operation of which is completed.

The lever unit includes a lever bracket which converts vertical operating force of a handle lever installed at one side of the seat into rotational force and transfers the rotational force to the clutch unit. Meanwhile, the pumping device may further include a return portion which returns the handle lever and the lever bracket to initial positions.

The return portion generally includes a return spring. The handle lever and the lever bracket are configured so as to be returned to the initial positions after the operating force of the user is released by action of the return spring.

In this context, Japanese Patent No. 4515146 B2 discloses a return spring having two pole portions formed at one side thereof. In the return spring, the two pole portions are configured of a first pole portion which engages with an input side member and a second pole portion which prevents separation of the spring through increase of a center diameter thereof when a lever is operated. However, the return spring has complicated manufacturing processes and many management dimensions since the two pole portions are formed at one side of the return spring, and thus a clearance of the lever may occur. In addition, noise may occur due to collision between the return spring and other components while the center diameter of the return spring increases when the lever is operated and the center diameter decreases when the lever is returned to an initial position.

Meanwhile, Korean Patent No. 10-0921849 discloses a structure in which a first elastic member for returning a lever is integrated with a second elastic member for returning a clutch unit. However, the structure has a problem in that the second elastic member instantaneously has decreased elastic force while the first elastic member is separated by external force when the lever is operated, resulting in generation of slip since torque is not transferred from an input side member to a control member.

DISCLOSURE

Technical Problem

Accordingly, the present invention has been made in view of the above-mentioned problem, and an object thereof is to provide a pumping device for a vehicle seat, configured such that a diameter of a return spring having a ring shape is decreased when operating force of a user is input thereto and the diameter of the return spring is increased when the operating force is released therefrom, thereby enabling manufacturing processes to be simplified since a separate separation prevention member is unnecessary and enabling generation of noise to be prevented when the return spring is returned to an initial position.

In addition, another object of the present invention is to provide a pumping device for a vehicle seat, configured such that a return means for returning a lever is separated from a returning means for returning a clutch portion, thereby enabling a slip phenomenon caused when the both returning means are integrated with each other to be prevented so as to reliably ensure an operation of the pumping device.

Technical Solution

In accordance with an aspect of the present invention, a pumping device for a vehicle seat includes a clutch portion transferring rotational force input from a handle lever to a link means, a brake portion fixing the link means, a cylindrical front housing accommodating the clutch portion and the brake portion therein and having a pair of stoppers formed on an outer side surface thereof so as to be spaced apart from each other at a predetermined interval, a lever bracket having a pair of bracket legs provided radially outwardly with respect to the respective stoppers, the lever bracket being rotatably arranged on the outer side surface of the front housing so as to connect the handle lever to the clutch portion, and a return spring having a main body portion configured of a ring-shaped leaf spring and a pair of bending portions formed by bending both end portions of the main body portion so as to extend between the pair of stoppers and the pair of bracket legs.

The return spring may be arranged between the lever bracket and the front housing on the outer side surface of the front housing, and a width between the pair of the bending portions may be decreased by rotation of the lever bracket.

One of the pair of bending portions may move in the same direction as a rotation direction of the lever bracket by rotation of the lever bracket, whereas movement of the other bending portion may be restricted by the pair of stoppers.

The pair of stoppers may be integrally formed with the front housing, and the pair of bracket legs may be integrally formed with the lever bracket.

The front housing may include a cylindrical large diameter portion and a small diameter portion protruding from a front surface of the large diameter portion so as to form a certain stepped portion, the main body portion of the return spring may be provided outside the small diameter portion, an inner diameter of the main body portion in an initial state may be smaller than an outer diameter of the large diameter portion, and an inner diameter of the main body portion in a state in which the lever bracket is maximally rotated may be larger than an outer diameter of the small diameter portion.

The clutch portion may include a clutch spring which generates restoring force in a direction opposite to the rotational force and returns the clutch portion to an initial position, the clutch spring may include a ring-shaped main body portion which is arranged between the lever bracket and the front housing on the outer side surface in front of the front housing and a pressurization portion formed by bending both end portions of the main body portion so as to extend rearward of the front housing, and the pressurization portion may pass and extend through a guide slot formed on the front housing.

Advantageous Effects

A pumping device for a vehicle seat according to the present invention has an effect of achieving simplification of manufacturing processes and reduction of manufacturing costs since a separate separation prevention member is unnecessary, and of preventing noise generated when a return spring is returned to an initial position.

In addition, the present invention is configured such that a return means for returning a lever is separated from a returning means for returning a clutch portion, thereby enabling a slip phenomenon caused when the both returning means are integrated with each other to be prevented so as to reliably ensure an operation of the pumping device.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Figure 1:
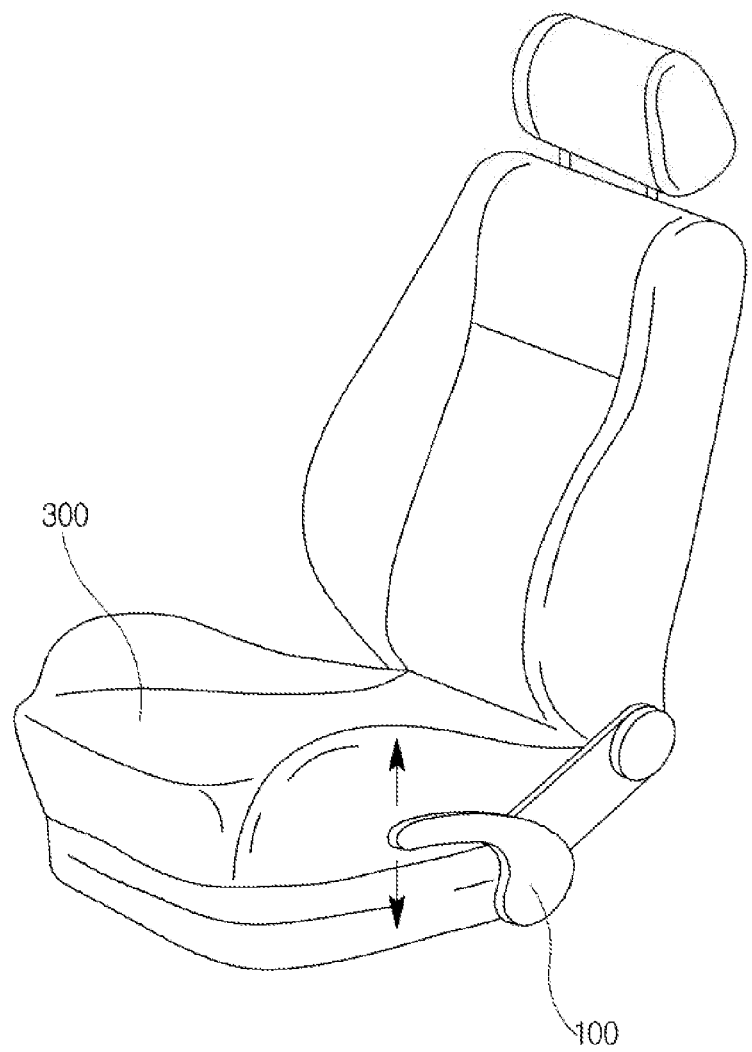
FIG. 1 is a view illustrating a vehicle seat having a height adjustment function.

Hereinafter, a pumping device for a vehicle seat according to exemplary embodiments of the present invention will be described in detail with reference to the accompanying drawings.

Since various modifications may be performed on the exemplary embodiments according to the concept of the present invention and the embodiments of the present invention can be implemented in a wide range of varied forms, specific exemplary embodiments of the present invention will be described herein in detail with reference to the appended drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the appended drawings of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise.

It will be further understood that the terms "comprises/comprising" or "includes/including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In addition, the following embodiments are provided so that this disclosure will be thorough and complete, and will fully convey the scope of the present invention to those skilled in the art. In the drawings, the shape, size, or the like of each component may be exaggerated for convenience of description and clarity.

Figure 2:
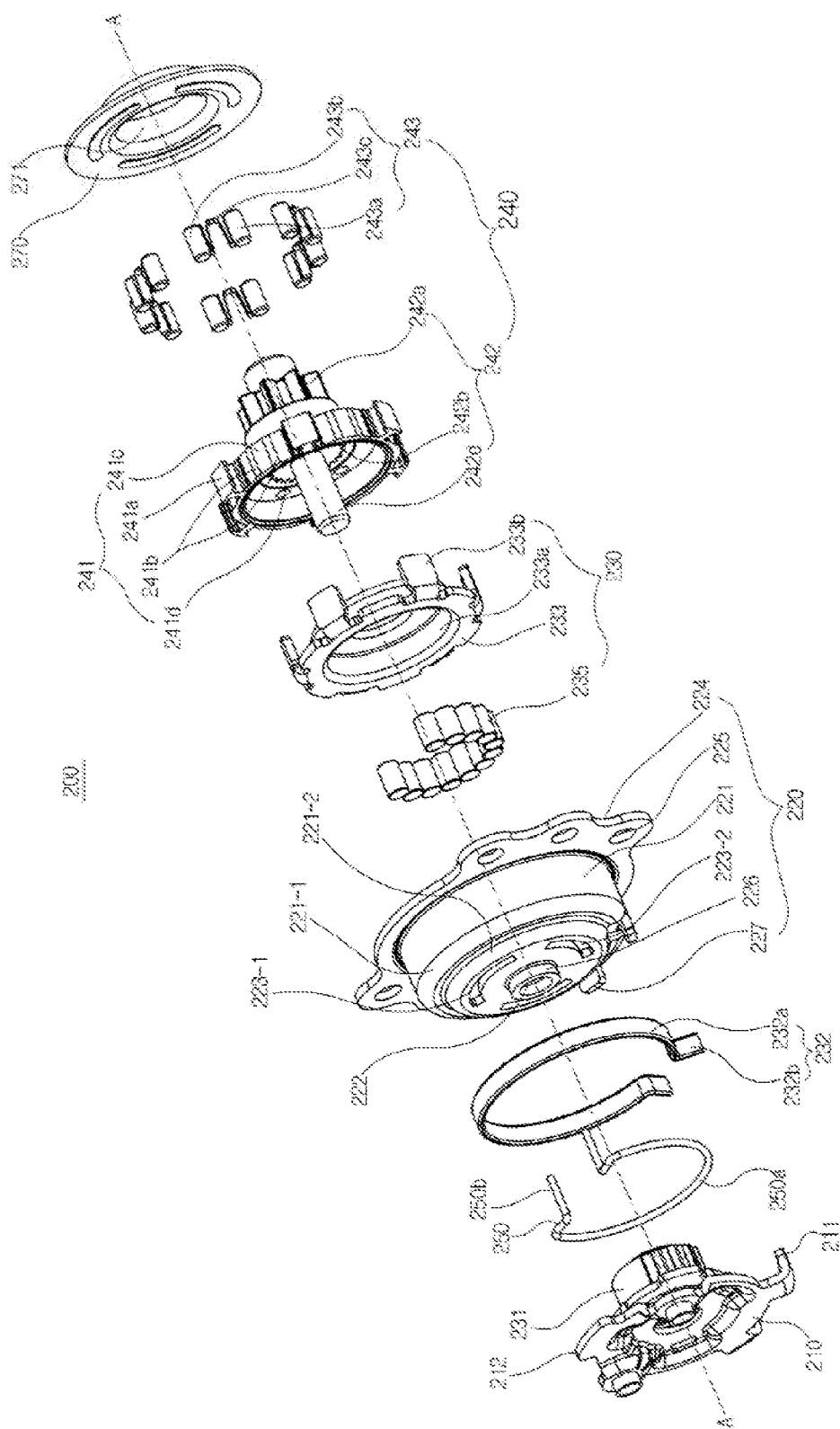
FIG. 2 is an exploded perspective view illustrating a pumping device for a vehicle seat according to an embodiment of the present invention.
Figure 3:
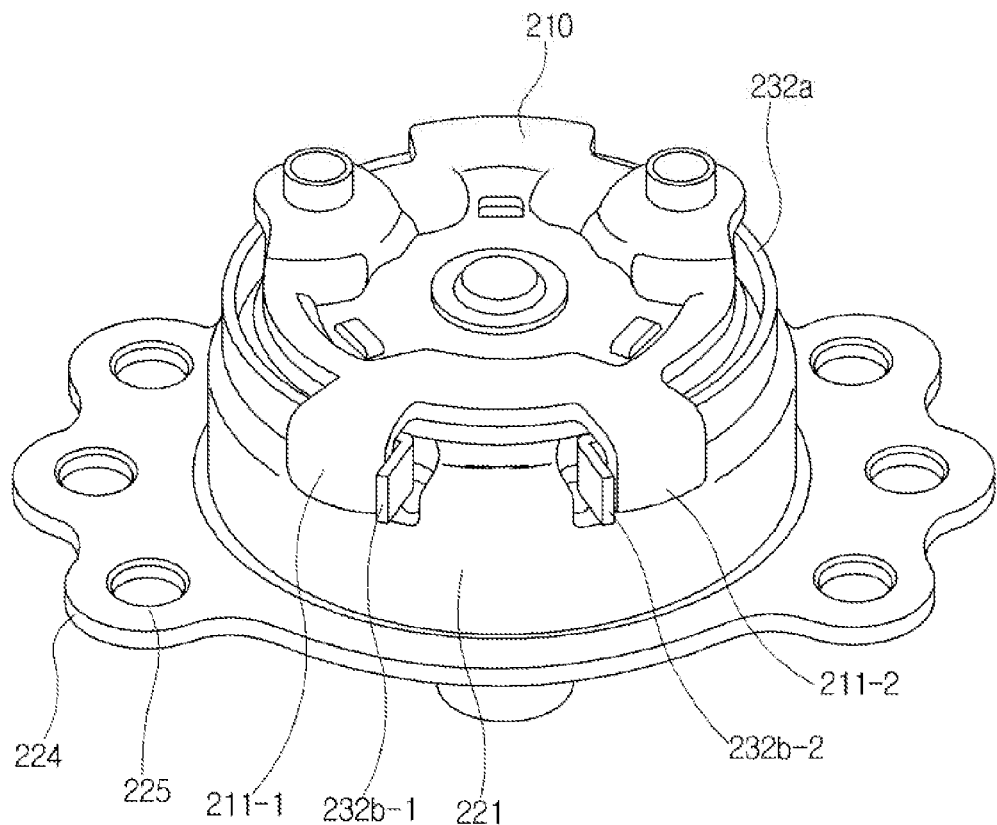
FIG. 3 is a coupled perspective view of the pumping device in FIG. 2.

FIG. 2 is an exploded perspective view illustrating a pumping device for a vehicle seat 200 according to an embodiment of the present invention. FIG. 3 is a coupled perspective view of the pumping device 200 in FIG. 2.

Referring to FIGS. 2 and 3, the pumping device 200 of a vehicle seat 300 according to the embodiment of the present invention includes a clutch portion 230 which transfers rotational force input from a handle lever 100 in FIG. 1 to a link means, a brake portion 240 which fixes the link means, a cylindrical front housing 220 which accommodates the clutch portion 230 and the brake portion 240 therein and has a pair of stoppers 227 formed on an outer side surface thereof so as to be spaced apart from each other at a predetermined interval, a lever bracket 210 which is rotatably arranged on the outer side surface of the front housing 220 to connect the handle lever 100 to the clutch portion 230 and has a pair of bracket legs 211 provided radially outwardly with respect to the respective stoppers 227, and a return spring 232 which has a main body portion 232a configured of a ring-shaped leaf spring and a pair of bending portions 232b formed by bending both end portions of the main body portion 232a so as to extend between the pair of stoppers 227 and the pair of bracket legs 211.

The front housing 220 includes a cylindrical body portion 221 having an inner space formed such that the front thereof is closed and the rear thereof is opened, and a side flange 224 formed at the opened rear of the cylindrical body portion 221. The front housing 220 has an axial hole 222 formed on a front surface portion corresponding to the other side of the body portion 221, a first boss portion 226 which is formed on the front surface portion so as to concentrically protrude from the axial hole 222 and rotatably supports an auxiliary shaft 242d of a brake shaft 242 to be described later, and a plurality of guide slots 223-1 and 223-2 formed on the front surface portions. The front housing 220 has fastening holes 225 formed on the side flange 224.

That is, the front housing 220 has the axial hole 222 and the first boss portion 226 formed at a central position of the front surface portion, the side flange 224 formed around the side surface, the plurality of fastening holes 225 formed on the side flange 224, and the plurality of guide slots 223-1 and 223-2 which are formed on the front surface portion so as to be generally concentric with the axial hole 222.

Here, a first guide slot 223-1 of the plurality of guide slots 223-1 and 223-2 is a space through which a bending portion pressurization portion 250b passes and extends, the bending portion pressurization portion 250b being formed by bending both end portions of a ring-shaped main body portion 250a of a clutch spring 250 so as to extend rearward of the front housing 220. Movement of the bending portion pressurization portion 250b of the clutch spring 250 is guided by the first guide slot 223-1. In addition, the first guide slot 223-1 simultaneously serves as a stopper of the clutch spring 250.

Meanwhile, a second guide slot 223-2 of the plurality of guide slots 223-1 and 223-2 is a space through which a guide leg (not shown) protruding from the lever bracket 210 passes. An amount of rotation of the handle lever, namely, an amount of rotation of the lever bracket 210 is restricted by the second guide slot 233-2 and the guide leg.

The axial hole 222 is formed to be generally concentric with a central axis A-A of the pumping device 200. Through such a configuration, the clutch portion 230 and the brake portion 240 to be described later are aligned with the central axis A-A.

The first boss portion 226 protrudes from the front surface portion of the front housing 220 and generally has a cylindrical shape. The first boss portion 226 serves to rotatably support the auxiliary shaft 242d of the brake shaft to be described later, and preferably serves to rotatably support the auxiliary shaft 242d in a radial bearing manner. The first boss portion 226 may be integrally provided with the front housing 220, and particularly the front surface portion, made of a metal material, of the front housing 220 may be formed through a burring process.

Meanwhile, a configuration of the clutch portion 230 is as follows.

The clutch portion 230 includes a clutch shaft 231 which is inserted into the front housing 220 while one end of the clutch shaft 231 is fixedly coupled to the lever bracket 210, a plurality of fitting pieces 235 which are arranged at regular intervals along an outer peripheral surface of the clutch shaft 231, and a clutch drum 233 which rotates along with rotation of the clutch shaft 231 through frictional contact with the fitting pieces 235.

The handle lever in FIG. 1 is connected to a front surface of the lever bracket 210. The axial hole 222 to which the clutch shaft 231 is coupled is formed at a central portion of the lever bracket 210. The lever bracket 210 has the plurality of bracket legs 211 protruding rearward of the front housing 220. The plurality of bracket legs 211 come into contact with the bending portions 232b of the return spring 232, and thus rotational force and restoring force are mutually transferred. Detailed configurations of the bracket legs 211 and the return spring 232 will be described later with reference to FIGS. 3 to 5.

Meanwhile, the clutch shaft 231 is located in the inner space of the front housing 220 in a state in which a front end of the clutch shaft 231 is fixed to the lever bracket 210. A central portion of the clutch shaft 231 is formed with an insertion hole into which a front end of the brake shaft 242 is inserted. In this case, a plurality of concave curved surfaces or planar cam surfaces are radially formed on an outer peripheral surface of a rear end of the clutch shaft 231, and the plurality of cam surfaces are preferably formed at regular intervals on the outer peripheral surface of the clutch shaft 231.

The fitting pieces 235 are arranged on the respective cam surfaces. In this case, the cam surfaces and the fitting pieces 235 are preferably arranged in one-to-one correspondence manner, respectively. The fitting pieces 235 are restrained between the cam surfaces and an inner peripheral surface of the clutch drum 233, and thus may move together with the cam surfaces during rotation of the clutch shaft 231. Each of the fitting pieces 235 has a ball or roller shape, but is not limited thereto. The fitting piece 235 may also have other shapes.

Meanwhile, the rear end of the clutch shaft 231 formed with the cam surfaces is located at a central portion of the clutch drum 233, and an inner peripheral surface of the central portion of the clutch drum 233 is formed with a pressurization surface 233a coming into frictional contact with the fitting pieces 235. That is, the fitting pieces 235 are respectively inserted between the cam surfaces formed on the outer peripheral surface of the clutch shaft 231 and the pressurization surface 233a of the clutch drum 233. The fitting pieces 235 come into contact with the cam surfaces of the clutch shaft 231 and the pressurization surface 233a of the clutch drum 233, respectively.

Accordingly, the fitting pieces 235 come into frictional contact with the cam surfaces of the clutch shaft 231 and the pressurization surface 233a of the clutch drum 233, respectively, when the clutch shaft 231 rotates. Consequently, rotational torque of the clutch shaft 231 is transferred to the clutch drum 233 through the fitting pieces 235.

In addition, the axial hole 222 is formed at the central portion of the clutch drum 233 in a penetrative form, and the outer peripheral surface of the clutch drum 233 is formed with a plurality of protrusion legs 233b which extend toward a brake wedge 241 in the central axis A-A direction. The protrusion legs 233b are inserted between respective wedge bosses 241a protruding from an outer peripheral surface of the brake wedge 241 to be described later, thereby enabling rotational force of the clutch drum 233 to be transferred to the brake wedge 241.

Meanwhile, the above-mentioned clutch spring 250 which provides elastic restoring force for returning the fitting pieces 235 to initial positions may be a separate configuration from the return spring 232 of the handle lever 100. As shown in FIG. 2, the clutch spring 250 according to the embodiment of the present invention is preferably a ring-shaped spring in consideration of the thickness of the pumping device 200 in the central axis A-A direction, and is arranged between the lever bracket 210 and the front housing 220. When a user rotates the lever bracket 210 using the handle lever 100, the fitting pieces 235 rotate in the same direction as the lever bracket 210 and the clutch spring 250 is compressed in the above rotation direction. Subsequently, when the rotational force applied to the lever bracket 210 is released, the fitting pieces 235 are returned to the initial positions by the elastic restoring force of the compressed clutch spring 250. Through the separate configuration of the clutch spring 250 from the return spring 232 of the handle lever 100, it may be possible to prevent a slip phenomenon between the fitting pieces 235 and the clutch drum 233 caused when the clutch spring 250 is integrally formed with the return spring 232. Thus, the rotational force may be effectively transferred from the fitting pieces 235 to the clutch drum 233.

Next, a configuration of the brake portion 240 will be described. The brake portion 240 is not limited to the following embodiment, and may be modified in various forms.

As described above, the brake portion 240 includes the brake wedge 241 forming the wedge bosses 241 which radially protrude from the outer peripheral surface thereof, the brake shaft 242 having an output gear 242a which is coupled to the brake wedge 241 and protrudes to an axial hole 271 of a back cover 270 so as to engage with a link side sector gear, and roller members 243 which are located on the outer peripheral surface of the brake wedge 241 to generate brake force as friction force against the front housing 220.

The brake wedge 241 has latch holes 241d formed to be generally concentric with the central axis A-A. The brake wedge 241 is coupled to the brake shaft 242 through a latch 242b formed at the brake shaft 242 in a latch manner, but the brake wedge 241 and the brake shaft 242 may also be an integral structure in a forced press-fit manner.

The plurality of wedge bosses 241a radially protrude at regular intervals on the outer peripheral surface of the brake wedge 241, and the protrusion legs 233b of the clutch drum 233 are inserted between the respective wedge bosses 241a as described above.

In addition, on the outer peripheral surface of the brake wedge 241, roller location surfaces 241b, into which first and second roller shafts 243a and 243b of each of the roller members 243 are inserted, are formed with the respective wedge bosses 241a being interposed therebetween. Restraint section surfaces 241c, which protrude from the outer peripheral surface of the brake wedge 241, are continuously formed between the roller location surfaces 241b. The restraint section surfaces 241c reduce a gap between the front housing 220 and the brake wedge 241, and thus realize wedge action on the roller member 243. Consequently, the restraint section surfaces 241c serve to restrain the brake wedge 241 using strong brake force and prevent rotation of the brake shaft 242.

The output gear 242a engages with the link side sector gear to lift or lower a link side when the brake force is released, and thus serves to restrain movement of the link side when the brake force is applied thereto.

Each of the roller members 243 includes a pair of first and second roller shafts 243a and 243b, and an insert spring 243c which is located between the first and second roller shafts 243a and 243b to push the first and second roller shafts 243a and 243b. The insert spring 243c has a structure of pushing the first and second roller shafts 243a and 243b located at both sides thereof while enclosing the associated wedge boss 241a of the brake wedge 241. To this end, the insert spring 243c has an "M" shape.

As shown in the drawings, movement of the first and second roller shafts 243a and 243b, which are assembled on the roller location surfaces 241b at the wedge bosses 241a of the brake wedge 241 to be subjected to the pushed force from the insert spring 243c, are restrained through the restraint section surfaces 241c, thereby enabling rotation of the brake wedge 241 to be restrained.

Meanwhile, the pumping device 200 according to the embodiment of the present invention includes the return spring 232 as a means for generating restoring force for returning the handle lever 100 and the lever bracket 210 to the initial positions when the rotational force applied to the lever bracket 210 through the handle lever 100 is released.

The return spring 232 according to the embodiment of the present invention is arranged outside the front housing 220. In detail, the return spring 232 is arranged between the lever bracket 210 and the front housing 220 on the outer side surface in front of the front housing 220, and the restoring force is transferred from the return spring 232 through the lever bracket 210 to the handle lever.

In addition, the return spring 232 includes the main body portion 232a formed in a ring-shaped leaf spring, and first and second bending portions 232b-1 and 232b-2 as the pair of bending portions 232b formed by bending both end portions of the main body portion 232a so as to extend radially outwardly from the main body portion 232a.

The lever bracket 210 includes first and second bracket legs 211-1 and 211-2 as the pair of bracket legs 211 protruding rearward of the front housing 220. The first bracket leg 211-1 pressurizes the first bending portion 232b-1 by counterclockwise rotation of the lever bracket 210 and moves the first bending portion 232b-1 toward the second bending portion 232b-2. The second bracket leg 211-2 pressurizes the second bending portion 232b-2 by clockwise rotation of the lever bracket 210 and moves the second bending portion 232b-2 toward the first bending portion 232b-1. That is, a width between the pair of the bending portions 232b is decreased by the rotation of the lever bracket 210.

Through such a configuration, the bracket legs 211 of the lever bracket 210 come into contact with the bending portions 232b of the return spring 232, and thus the rotational force and the restoring force are mutually transferred.

Meanwhile, the front housing 220 has first and second stoppers 227-1 and 227-2 as the pair of stoppers 227 which are spaced apart from each other at a predetermined interval on the outer side surface of the front housing 220, as a means for restricting movement of the first and second bending portions 232b-1 and 232b-2. The first and second bending portions 232b-1 and 232b-2 are arranged between the first and second stoppers 227-1 and 227-2 and are configured such that the width between the first and second bending portions 232b-1 and 232b-2 is decreased by the rotation of the lever bracket 210.

In this case, through such a configuration of the first and second bending portions 232b-1 and 232b-2 arranged between the first and second stoppers 227-1 and 227-2, the first and second bending portions 232b-1 and 232b-2 are movable in a direction close to each other, but are not movable in a direction away from each other. The first and second stoppers 227-1 and 227-2 may be formed in a separate member, but are integrally formed with each other on the front housing 220 in order to reduce manufacturing costs and simplify manufacturing processes. Preferably, the first and second stoppers 227-1 and 227-2 may also be formed by bending a portion of the front housing 220 made of a metal material.

Figure 4:
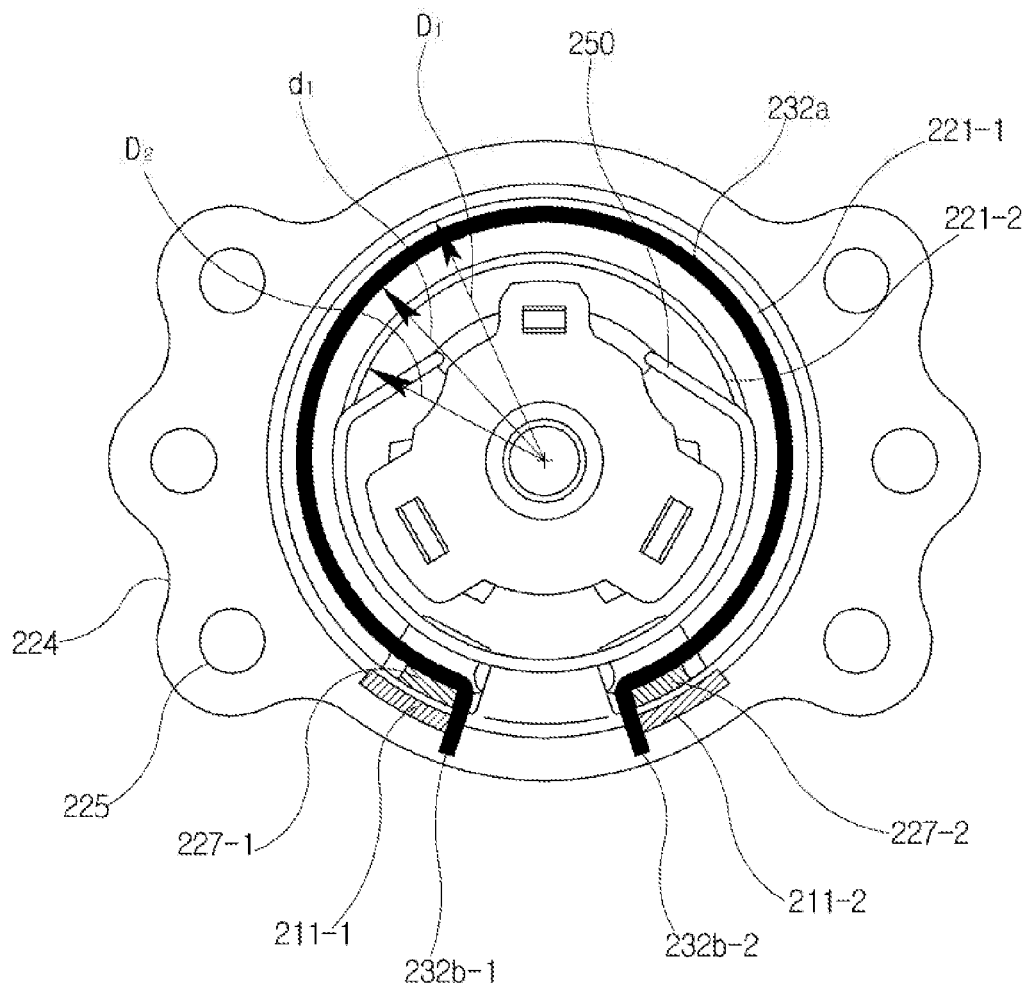
FIG. 4 is a cross-sectional view cutting the pumping device shown in FIGS. 2 and 3 in a vertical direction to a central axis direction, and illustrating an initial state before operating force of a user does not act on the pumping device.
Figure 5:
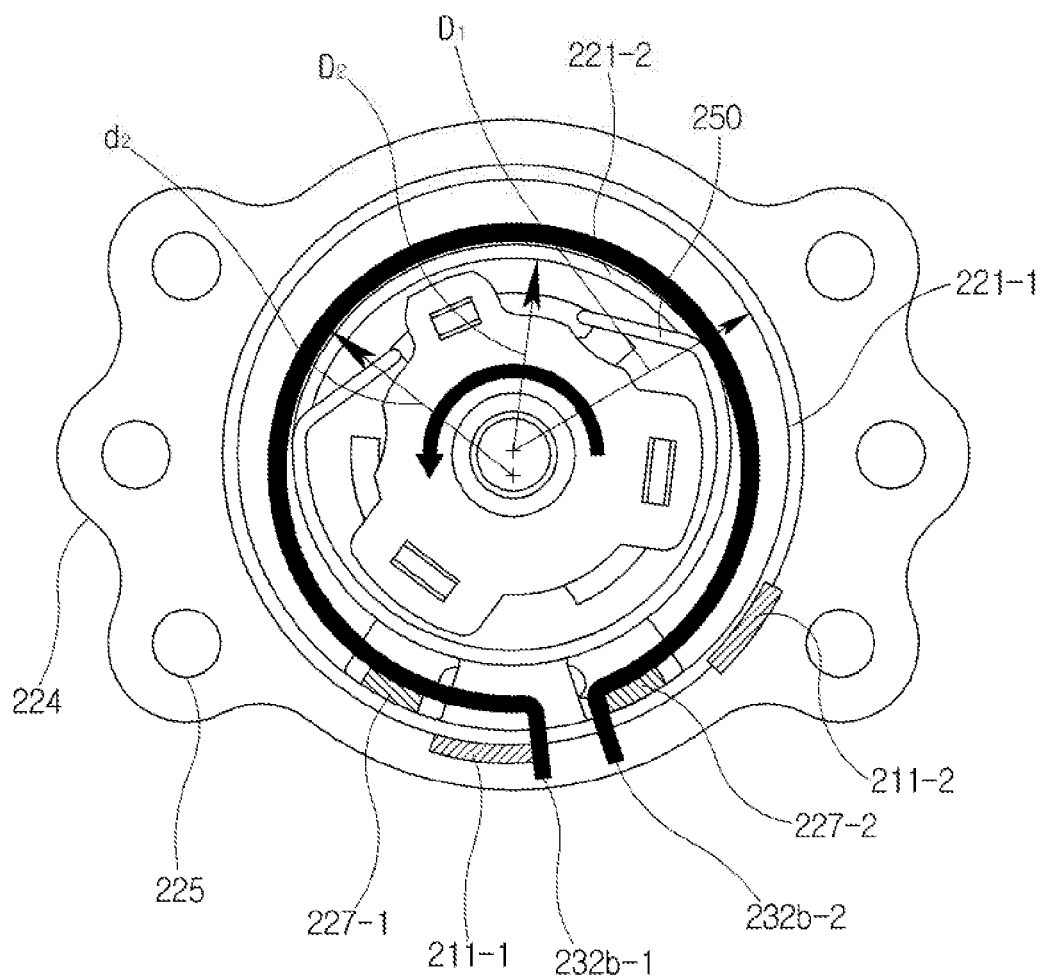
FIG. 5 is a cross-sectional view cutting the pumping device shown in FIGS. 2 and 3 in the vertical direction to the central axis direction, and illustrating a state in which the operating force of the user acts on the pumping device.

FIGS. 4 and 5 are cross-sectional views cutting the pumping device 200 shown in FIGS. 2 and 3 in the vertical direction to the central axis direction. FIG. 4 shows an initial state before the operating force of the user by the lever bracket 210 does not act on the return spring 232. FIG. 5 shows a state in which the operating force of the user acts on the return spring 232 in the counterclockwise direction.

First, referring to FIG. 4, the return spring 232 according to the embodiment of the present invention is a compression spring having preferably a ring shape or more preferably a plate shape. The return spring 232 includes the ring-shaped main body portion 232a arranged between the lever bracket 210 and the front housing 220 on the outer side surface of the front housing 220, and the first and second bending portions 232b-1 and 232b-2 formed by bending both end portions of the ring-shaped main body portion 232a so as to extend between the pair of stoppers 227 and the pair of bracket legs 211. In this case, the first and second bending portions 232b-1 and 232b-2 are movable in a direction close to each other by the action of the first and second stoppers 227-1 and 227-2, but are not movable in a direction away from each other.

Meanwhile, the rotational force is mutually transferred between the first or second lever bracket leg 211-1 or 211-2 provided in the lever bracket 210 so as to protrude rearward of the front housing 220 and the first or second bending portion 232b-1 or 232b-2. As shown in FIG. 4, it is preferable that the first bracket leg 211-1 is disposed to the left of the first bending portion 232b-1 and the second bracket leg 211-2 is disposed to the right of the second bending portion 232b-2. The first and second bracket legs 211-1 and 211-2 may be separately formed from the lever bracket 210, but are preferably formed by bending a portion of the lever bracket 210 made of a metal material.

That is, the first bracket leg 211-1 pressurizes the first bending portion 232b-1 by counterclockwise operating force of the user such that the first bending portion 232b-1 moves toward the second bending portion 232b-2, and the second bracket leg 211-2 pressurizes the second bending portion 232b-2 by clockwise operating force of the user such that the second bending portion 232b-2 moves toward the first bending portion 232b-1. On the other hand, when the operating force of the user is released, the first bending portion 232b-1 moved toward the second bending portion 232b-2 pressurizes the first bracket leg 211-1 in the clockwise direction while moving in a direction away from the second bending portion 232b-2 and the second bending portion 232b-2 moved toward the first bending portion 232b-1 pressurizes the second bracket leg 211-2 in the counterclockwise direction while moving in a direction away from the first bending portion 232b-1. Consequently, the handle lever is returned to the initial position.

In this case, by the action of the first and second stoppers 227-1 and 227-2, the second bending portion 232b-2 is fixed by the second stopper 227-2 when the first bending portion 232b-1 moves toward the second bending portion 232b-2, and the first bending portion 232b-1 is fixed by the first stopper 227-1 when the second bending portion 232b-2 moves toward the first bending portion 232b-1. That is, by the action of the first and second stoppers 227-1 and 227-2, the second bending portion 232b-2 is a fixed end when the first bending portion 232b-1 is a free end, and the first bending portion 232b-1 is a fixed end when the second bending portion 232b-2 is a free end. Consequently, spring action may be effectively realized.

As such, when the operating force of the user is applied to the ring-shaped return spring 232, a diameter of the ring-shaped return spring 232 is decreased compared to the initial state. Accordingly, simplification of manufacturing processes and reduction of manufacturing costs may be achieved since a separate radial separation prevention member for the return spring 232 is unnecessary compared to the related art in which the diameter of the return spring 232 is increased. In addition, it may be possible to prevent generation of noise caused due to collision between the return spring 232 and other components while the return spring 232 is returned to the initial position, namely, the diameter of the return spring 232 is increased when the operation force of the user is released.

The action of the return spring 232 according to the embodiment of the present invention will be described in more detail with reference to FIG. 5.

When the return spring 232 receives rotational force in the counterclockwise direction on the basis of the initial state shown in FIG. 4, the lever bracket 210 is rotated and thus the first bracket leg 211-1 moves the first bending portion 232b-1 toward the second bending portion 232b-2 from the initial state in the counterclockwise direction, as shown in FIG. 5.

In this case, the counterclockwise movement of the second bending portion 232b-2 is restricted by the action of the second stopper 227-2, and thus the second bending portion 232b-2 is fixed, namely, is a fixed end.

The diameter of the ring-shaped main body portion 232a of the return spring 232 is decreased and the main body portion 232a is compressed while the first bending portion 232b-1 moves toward the second bending portion 232b-2.

Meanwhile, when the operation force of the user is released, the restoring force for returning the compressed ring-shaped main body portion 232a to the initial state acts on the main body portion 232a. In this case, the second bending portion 232b-2 is maintained in the fixed state by the second stopper 227-2 and only the first bending portion 232b-1 moves in the clockwise direction. The restoring force for moving the first bracket leg 211-1 in the clockwise direction by the first bending portion 232b-1 acts on the first bracket leg 211-1, and thus the lever bracket 210 and the handle lever 100 are returned to the initial positions.

In contrast, when the return spring 232 receives the rotational force in the clockwise direction by the clockwise action of the operating force of the user, the second bending portion 232b-2 is pressurized by the second bracket leg 211-2 and acts as a movable free end. In addition, the clockwise rotation of the first bending portion 232b-1 is restricted by the first stopper 227-1 and the first bending portion 232b-1 acts as a fixed end, thereby compressing the ring-shaped main body portion 232a of the return spring 232.

In this case, when the operating force of the user is released, the lever bracket 210 and the handle lever 100 are returned to the initial positions in the same manner as that described above except that the direction is opposed to the above case.

Figure 6:
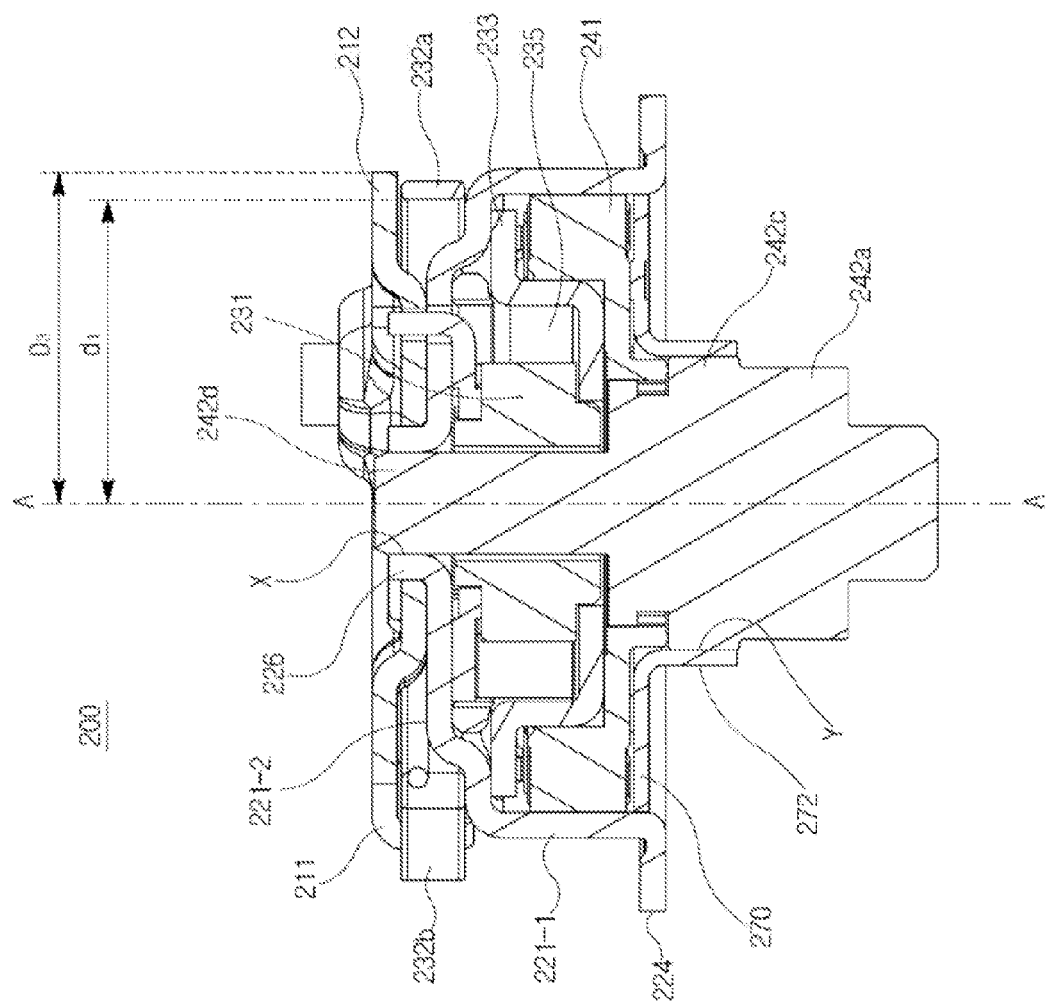
FIG. 6 is a cross-sectional view cutting the pumping device 200 shown in FIGS. 2 and 3 in a direction parallel with the central axis direction.

Meanwhile, the pumping device for a vehicle seat 200 according to the embodiment of the present invention may further include a configuration for preventing separation of the return spring in the central axis A-A direction. FIG. 6 is a cross-sectional view cutting the pumping device 200 shown in FIGS. 2 and 3 in a direction parallel with the central axis direction, and shows the axial separation prevention configuration.

Referring to FIG. 6, the body portion 221 of the front housing 220 of the pumping device for a vehicle seat 200 according to the embodiment of the present invention includes a cylindrical large diameter portion 221-1 and a small diameter portion 221-2 protruding from a front surface of the large diameter portion 221-1 so as to form a certain stepped portion. The main body portion 232a of the return spring 232 is provided outside the small diameter portion 221-2.

In this case, an inner diameter d1 of the main body portion 232a of the return spring 232 in an initial state is smaller than an outer diameter D1 of the large diameter portion 221-1. An inner diameter d2 of the main body portion 232a in a state in which the lever bracket 210 is maximally rotated is larger than an outer diameter D2 of the small diameter portion 221-2.

That is, the main body portion 232a of the return spring 232 is arranged at the stepped portion between the large diameter portion 221-1 and the small diameter portion 221-2 of the front housing 220. The maximum inner diameter d1 before the main body portion 232a is deformed is smaller than the outer diameter D1 of the large diameter portion 221-1 and the minimum inner diameter d2 after the main body portion 232a is deformed is larger than the outer diameter D2 of the small diameter portion 221-2. Therefore, when the pumping device 200 is operated, the main body portion 232a may be prevented from being separated rearward of the front housing 220.

In addition, in order to prevent forward separation of the return spring 232, the lever bracket 210 may include a separation prevention portion 212 which protrudes and extends radially outwardly from a rotation axis thereof. A maximum distance D3 from the rotation axis A-A of the lever bracket 210 to the separation prevention portion 212 is larger than the inner diameter d1 of the main body portion 232a of the return spring 232 in the initial state.

Through such a separation prevention configuration, it may be possible to prevent the separation of the return spring 232 in the forward or rearward direction of the front housing 220 when the return spring 232 is deformed and to reliably ensure the operation of the pumping device.

Various embodiments have been described in the best mode for carrying out the invention. It will be understood that the above-mentioned technical configurations of the exemplary embodiments may be executed in order to enable those of ordinary skill in the art to embody and practice the invention in other specific forms without changing the spirit or essential features of the invention.

Although the present invention has been described with respect to the illustrative embodiments, it will be apparent to those skilled in the art that various variations and modifications may be made without departing from the spirit and scope of the invention as defined in the following claims.

The invention claimed is:

1. A pumping device for a vehicle seat, comprising:
   a clutch portion transferring rotational force input from a handle lever to an output gear;
   a brake portion fixing the output gear;
   a cylindrical front housing accommodating the clutch portion and the brake portion therein and having a pair of stoppers formed on an outer side surface thereof so as to be spaced apart from each other at a predetermined interval;
   a lever bracket having a pair of bracket legs provided radially outwardly with respect to the respective stoppers, the lever bracket being rotatably arranged on the outer side surface of the front housing so as to connect the handle lever to the clutch portion; and
   a return spring having a main body portion configured of a ring-shaped leaf spring and a pair of bending portions formed by bending both end portions of the main body portion so as to extend between the pair of stoppers and the pair of bracket legs,
   wherein:
   the front housing comprises a cylindrical large diameter portion and a small diameter portion protruding from a front surface of the large diameter portion so as to form a certain stepped portion; and
   the main body portion of the return spring is provided outside the small diameter portion, an inner diameter of the main body portion in an initial state is smaller than an outer diameter of the large diameter portion, and an inner diameter of the main body portion in a state in which the lever bracket is maximally rotated is larger than an outer diameter of the small diameter portion.

2. The pumping device according to claim 1, wherein the return spring is arranged between the lever bracket and the front housing on the outer side surface of the front housing, and a width between the pair of the bending portions is decreased by rotation of the lever bracket.

3. The pumping device according to claim 1, wherein one of the pair of bending portions moves in the same direction as a rotation direction of the lever bracket by rotation of the lever bracket, whereas movement of the other bending portion is restricted by any one of the pair of stoppers.

4. The pumping device according to claim 1, wherein the pair of stoppers are integrally formed with the front housing, and the pair of bracket legs are integrally formed with the lever bracket.

5. The pumping device according to claim 1, wherein:
   the lever bracket further comprises a separation prevention portion for preventing forward separation of the return spring; and
   a maximum distance from a rotation axis of the lever bracket to the separation prevention portion is larger than an inner diameter of the main body portion of the return spring in an initial state.

6. The pumping device according to claim 1, wherein:
   the clutch portion comprises a clutch spring which generates restoring force in a direction opposite to the rotational force and returns the clutch portion to an initial position;
   the clutch spring comprises a ring-shaped main body portion which is arranged between the lever bracket and the front housing on the outer side surface in front of the front housing, and a pressurization portion formed by bending both end portions of the main body portion so as to extend rearward of the front housing; and
   the pressurization portion passes and extends through a guide slot formed on the front housing.

* * * * *